3,360,483
CATALYSTS FOR OXYCHLORINATION REACTIONS

Louis H. Diamond, Yardley, Pa., and Walter Lobunez, Princeton, N.J., assignors to FMC Corporation, New York, N.Y., a corporation of Delaware
No Drawing. Filed Oct. 2, 1964, Ser. No. 401,227
3 Claims. (Cl. 252—441)

ABSTRACT OF THE DISCLOSURE

A catalyst for carrying out either Deacon reactions, oxychlorination reactions, or dehydrochlorination reactions, preferably at temperatures of from about 325 to 600° C., in which said catalyst consists essentially of a mixture of (a) cupric silicate and (b) a magnesium compound from the group consisting of magnesium chloride and magnesium silicate, wherein the relative proportions of (a) to (b) provide 0.1 to 4 moles of magnesium ion per mole cupric ion and said catalyst is carried on a porous, adsorptive carrier; the catalyst may also contain a didymium compound from the group consisting of didymium chloride and didymium silicate in amounts of up to 4 moles of didymium ion per mole of cupric ion.

---

This invention relates to catalytic Deacon reactions, oxychlorination reactions and dehydrochlorination reactions, and particularly to novel catalysts for these reactions.

It is known to react hydrogen chloride with oxygen in the presence of a catalyst, in a so-called Deacon reaction, to form free chlorine which is usable in chlorination reactions. It also is known to chlorinate hydrocarbons, or to further chlorinate partially chlorinated hydrocarbons, in so-called oxychlorination reactions in which chlorine, for example that liberated from hydrogen chloride as discussed above, is reacted with the hydrocarbon in the presence of an oxychlorination catalyst. Where it is desired to produce unsaturated chlorinated hydrocarbons, e.g. trichloroethylene, from saturated hydrocarbon precursors, e.g. ethane, the reaction sequence involves a dehydrochlorination which likewise can be catalyzed.

This series of reactions is illustrated in the following equations, where Equation I represents conversion of hydrogen chloride to free chlorine, Equation II represents oxychlorination of ethane with hydrogen chloride and oxygen to yield tetrachlorethane, Equation III represents oxychlorination of methane with chlorine and oxygen to yield carbon tetrachloride, and Equation IV shows dehydrochlorination of pentachloroethane to yield perchloroethylene.

EQUATION I

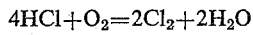

$$4HCl + O_2 = 2Cl_2 + 2H_2O$$

EQUATION II

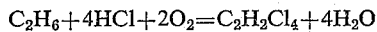

$$C_2H_6 + 4HCl + 2O_2 = C_2H_2Cl_4 + 4H_2O$$

EQUATION III

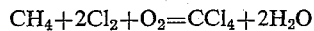

$$CH_4 + 2Cl_2 + O_2 = CCl_4 + 2H_2O$$

EQUATION IV

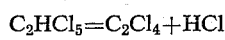

$$C_2HCl_5 = C_2Cl_4 + HCl$$

It is highly desirable to carry out combinations of the above reactions in single processes employing single catalysts. Thus the conversion of hydrogen chloride to chlorine desirably is carried out in the same process as oxychlorination of hydrocarbons; the reactants are all fed together to the reaction zone, and both reactions are catalyzed with the same catalyst. In preparation of unsaturated chlorinated hydrocarbons from saturated hydrocarbons the dehydrochlorination reaction is also involved, and the hydrogen chloride liberated in that reaction in turn is reacted with oxygen over the catalyst to liberate chlorine which enters into chlorination of the hydrocarbon.

The ability of a given catalyst to assist in all of these reactions is dependent upon several factors. Firstly, the catalyst must be an effective promoter of all the reactions involved. This is vital not only for reasons of efficiency, but also for safety, because use of catalysts having too low catalytic activity makes it necessary to employ excessive amounts of oxygen, a situation leading to formation of flammable and detonable conditions in the process.

Fully as important, the catalysts must be resistant to deactivation caused by losses of catalytic agents which volatilize at useful reaction temperatures, and they must not become tacky upon being heated. This latter requirement is particularly important when the catalyst is employed in a fluid bed process, and accordingly must remain divided and fluidized. At the same time, the catalyst must be selective, not unduly promoting side reactions such as oxidation of the hydrocarbon to form carbonyl groups, carbon monoxide, carbon dioxide, carbon, phosgene and the like.

The catalyst most commonly employed heretofore in Deacon reactions and in oxychlorination reactions is cupric chloride, although a variety of other catalysts including ferric chloride, chromic oxide and cupric silicate have been found to have catalytic activity in these reactions.

No one of these catalysts, however, has met all of the above requirements, namely effectiveness in catalyzing all of the reactions so that they can proceed to a high yield of desired products in the absence of excessive and unusable amounts of oxygen, selectivity in these reactions with consequent avoidance of undue oxidation of reactant hydrocarbons, and physical and chemical durability under reaction conditions which include exposure to elevated temperatures.

It therefore is the object of this invention to provide for oxychlorination reactions, catalysts which meet all of the above requirements.

It has now been found that catalysts having as catalytic agents cupric silicate together with magnesium chloride or magnesium silicate, distributed on a porous and adsorptive carrier, are effective, durable and selective catalysts for Deacon, oxychlorination and dehydrochlorination reactions. In the preferred embodiment, the catalyst also contains didymium chloride or silicate. The didymium is a mixture of rare earth elements, consisting substantially of lanthanum, neodymium and smaller quantities of praseodymium, cerium and samarium. The analysis of a typical sample of didymium chloride, that used in the examples hereinafter, accomplished by converting the chloride to the oxide, shows the following composition: $La_2O_3$, 45%; $Nd_2O_3$, 38%; $Pr_6O_{11}$, 11%; $Sm_2O_3$, 4%, other 2%. Obviously, modifications in this particular composition may be made without departing from the scope of this invention.

The catalytic agents, namely the cupric silicate, the magnesium compounds and where used, the didymium compounds are employed in the total amount of about 1 to 15% on the weight of the carrier. The cupric silicate and magnesium compound are present in the relative molar proportions of 0.1 to 4, and preferably 0.5 to 3, moles of magnesium ion per mole of cupric ion, while catalysts including the didymium chloride or silicate employ the didymium compound (calculated as the didymium metal ions) in the relative molar proportion to cupric silicate of up to about 4 moles of the didymium metal ions per mole of cupric ion.

The catalysts of this invention are highly effective in promoting all of the Deacon, oxychlorination and dehydrochlorination reactions, yet do not cause undue occurrence of side reactions such as oxidation. Furthermore, they are capable of use at reaction temperatures as high as about 420° to 600° C., necessary particularly for effective dehydrochlorination in reactions where it is desired to produce unsaturated chlorinated hydrocarbons in one overall process.

The catalysts of this invention are prepared by precipitating the catalytic agents, that is the cupric silicate, magnesium chloride or magnesium silicate, and where used the didymium chloride or didymium silicate, onto the carrier. The cupric ion suitably is introduced onto the carrier as a soluble copper salt, for example as cupric chloride or cupric sulfate, dissolved in water. An aqueous solution containing the proper amount of sodium silicate (an amount chemically equivalent to the amount of copper salt) is then added to the copper-bearing catalyst support which may be dried or not before addition of the sodium silicate, with the concentration of the silicate solution being such as to provide a thin slurry of the carrier and adsorbed reactants. In a few minutes the catalyst product is filtered, and if desired, washed with water and dried thoroughly. Preferably, the drying involves slow evaporation of water, for example, by permitting the catalyst to dry at room temperature over several hours, e.g., 24 hours at ambient or reduced pressures and thereafter completing drying in an oven or in a fluidized-bed dryer with the temperature being raised gradually from 40° C. to 120° C. over several hours.

The magnesium chloride and didymium chloride suitably are deposited on the carrier by preparing solutions of these chlorides, mixing these solutions separately or together with the carrier bearing the copper silicate, and drying the resulting powder. Where it is desired to provide magnesium and didymium silicates as catalytic materials, soluble magnesium and didymium salts such as the chlorides are converted to the silicates by addition of sodium silicate in the same fashion as described above for formation of copper silicate. Where desired the magnesium and didymium silicate catalysts can be formed together with the copper silicate on the carrier.

The total amount of catalyst carried on the carrier is from about 1 to about 15% by weight. Use of less than about 1% does not provide for sufficient catalysis of the herein reactions, whereas use of more than about 15% is unnecessary since it is the catalyst surface available to the reactants which is important, and deposition of more than 15% of the catalytic materials on the carrier merely results in building up thicker layers which have no added catalytic effect. It is apparent, however, that if desired, more than 15% can be deposited on the carrier, and use of such additional amounts is within the scope of this invention.

The cupric silicate and magnesium chloride or silicate are employed in amounts relative to one another of 0.1 to 4, and preferably 0.5 to 3, moles of magnesium ion per mole of cupric ion. Where the didymium chloride or silicate is employed together with these other catalytic agents, it may comprise up to 85% of the total catalytic agents present, and is used in an amount relative to cupric ion, on the basis of moles of metal ions, of 0 to 4 moles of didymium metal ions per mole of cupric ion.

The porous, adsorptive carrier employed preferably is a diatomaceous earth, suitably Celite, which is a Lompoc, California diatomite produced by the Johns-Manville Corporation. Other useful carriers include infusorial earths, silicate clays, silica gels, pumice and alumina.

The particle size of the carrier varies depending on the type of reaction in which the catalyst is to be employed. For fluid bed reactions it is desirable to have the catalyst particles within particle size ranges of 10–600 microns, whereas reactions in which the catalyst is present in a fixed bed and reactants pass through or over it, normally do not require such fine particles, and can operate with particles having sizes up to 0.5 inch in diameter.

The reactants for the Deacon, oxychlorination and dehydrochlorination reactions are some or all of hydrogen chloride, chlorine, oxygen and a hydrocarbon gas or partially chlorinated hydrocarbon gas. The relative proportions of these reactants in the various reactions are determined from the reactions involved. They depend on the extent of chlorination of the hydrocarbon desired, and for the oxychlorinations involving derivatives of methane, ethane, ethylene, propylene and propane can vary between 0.6 to 10.0 gram atoms of chlorine (introduced as hydrogen chloride and/or chlorine), and 0.2 to 6.0 moles of oxygen for each mole of the hydrocarbon introduced into the reactor.

The oxygen may be introduced either as gaseous oxygen, as gaseous oxygen diluted with an inert gas or gases such as nitrogen, as air, or as air enriched with oxygen.

The hydrocarbons and partially chlorinated hydrocarbon gases which are reacted in the present oxychlorination process are exemplified by methane, ethane, ethylene, propylene, propane, dichloroethane, tetrachloroethane, vinyl chloride and dichloroethylene. It is apparent that the term "gases" as used herein includes hydrocarbons and chlorinated hydrocarbons which are not gaseous under ambient conditions, but are vaporized under oxychlorination reaction conditions, as well as those which are gaseous at ambient conditions.

Products of these reactions typically are fully chlorinated and partially chlorinated hydrocarbons, such as carbon tetrachloride, perchloroethyelne, trichloroethylene, dichloroethane, vinyl chloride, dichloroethylenes and methylenechloride together with side products such as water, carbon dioxide, carbon monoxide and the like The products are in vapor phase as they leave the reactor. The desired products are condensed from the side products and purified by means common in the art. Normally the chlorinated hydrocarbon products are obtained as mixtures of products that can be separated, for example by fractional distillation, selective adsorption and desorption operations, selective dissolution and the like.

The reactions employing the catalysts of this invention preferably are carried out in a fluidized bed system. In the preferred manner of operating, the chlorine source (hydrogen chloride and/or chlorine), air and the hydrocarbon gas to be reacted are charged to the bottom of a reactor containing finely divided catalyst. The fluidization of the catalyst suitably is initiated with nitrogen and the various reaction gases are then introduced gradually until they reach the proper proportions and reaction commences, at which time recovery of reaction products at the far end of the reactor is started.

Linear gas velocity through the catalyst bed normally is 0.05 to 2.5 feet per second higher velocities cause undue carryover of catalyst fines whereas lower velocities do not effect proper fluidization. Where heat must be supplied to the reaction system common means such as preheating feed gases, electrical heaters and the like may be employed. The reactions generally are exothermic, however, and normally it is necessary to cool the system. To this end, cooling means such as cooling elements carrying fluids may be present in the fluidized bed itself or surrounding the bed.

Alternatively the reaction is carried out in a system in which the catalyst is in a fixed bed, and reactants are passed through or over it. The same general considerations apply as apply in the fluidized bed system, it being necessary to provide heat in some stages and withdraw heat at others, and suitable heat exchange means must be provided.

The reaction of hydrogen chloride and/or chlorine and oxygen with the hydrocarbon or partially chlorinated hydrocarbons gas to yield chlorinated hydrocarbons is best carried out at about 325° to 600° C. The dehydrochlorination reaction is carried out normally at about 420° to 600° C.

The reactions can be conducted at ambient or elevated pressures. The chlorinated hydrocarbon products frequently are best recovered at an elevated pressure, however, and accordingly carrying out the reaction at the desired product separation pressure is desirable.

The following examples are presented by way of illustration of the preparation of the catalysts of this invention and their use in typical oxychlorination reactions. They are not to be considered as limiting the scope of this invention in any way.

*Example 1.—Preparation of catalyst*

A solution of 10.8 g. of cupric chloride in 120 ml. of water was mixed with 65 g. of Celite V particles, mesh size 60–80. The paste that was formed was dried at room temperature for 72 hours and then mixed with 120 ml. of an aqueous solution containing 8.1 g. of sodium silicate having an alkali to silica ratio of 1:2.5. This mixture was dried at room temperature overnight and then at 100–300° C. for 2 hours. Finally, it was mixed with 116 ml. of an aqueous solution containing 3.1 g. of magnesium chloride. The final mixture was dried at room temperature for 70 hours and then at 60–100° C. for 40 minutes, and then heated from 100° C. to 1000° C. over a 40-minute period. The catalyst was cooled slowly to room temperature and stored in a desiccator before use.

*Example 2.—Oxychlorination of ethane*

A reactor consisting of a glass tube (1⅝ inches I.D., 18 inches long) containing a perforated catalyst support was positioned vertically and charged with 74 g. of the catalyst described in Example 1. Reactant gases were introduced into the lower part of the reactor at the following rates (in millimoles per minute): ethnae 8.0, hydrogen chloride 25.5, air 42.0, oxygen 11.0. The total flow of reactants was sufficient to maintain the catalyst bed in a fluidized condition. The reaction temperature in the tube was 409° C. and it was maintained at this level by the means of a 24-inch tubular electrical furnace controlled by a powerstat. The reaction products emerging from the upper part of the reactor were collected, weighed, and analyzed. Eighty-four percent of the total hydrogen chloride and 61% of ethane introduced into reactor were incorporated in the chlorinated products. Ethane oxidation was 9%.

*Example 3.—Preparation of catalyst*

Type V Celite particles (1196 g., mesh size 80–200+) were mixed with 133 g. of cupric chloride dissolved in 2240 ml. of distilled water. This mixture was left at ambient temperature for 48 hours, and then dried at 74° C. for 48 hours and then at 115° C. for 3 hours. After that the dry particles were mixed for 2 hours with 2450 ml. of an aqueous solution containing 99 g. of sodium silicate. Then the solids were separated and dried at room temperature overnight, then at 80–100° C. for 48 hours, and finally at 110° C. for 3 hours. After that the dry particles were mixed with 2250 ml. of an aqueous solution containing 133 g. of didymium chloride, and 20.5 g. of magnesium chloride. After several hours, the solids were separated and dried at 85° C. for 70 hours and then at 105° C. for 4 hours. The particles were sieved through a 60 mesh sieve and shaken on a 200+ mesh sieve, to remove catalyst fines. The catalyst prepared in this way contained 1.1% of copper, 0.4% of magnesium and 3.3% of didymium, the latter expressed as $R_2O_3$.

*Example 4.—Oxychlorination of ethylene*

In an experiment involving ethylene, the reactor used in Example 2 was charged with 40 g. of the catalyst described in Example 3. The flow of the reactants were (in millimoles per minute): ethylene 8.0, chlorine 12.56, air 34.6, and nitrogen 20.0. The reaction temperature was 462° C. The product mixture contained (in weight percent) 48.8% of trichloroethylene, 23.4% of perchloroethylene, and 20.0% of dichloroethylene. Chlorine utilization was 74%, and ethylene utilization was 83%. The amount of ethylene lost because of oxidation was 12%.

*Example 5.—Oxychlorination of ethylene*

In this experiment the reactor used in Example 2 was charged with 60 g. of catalyst from the same batch as that used in Example 4. Flow rates in millimoles per minute of reactants in this Example 5 were: ethylene 7.7, hydrogen chloride 6.7, chlorine 8.65, air 35.5 and nitrogen 21.0. The reaction temperature was 457° C. The product mixture consisted of 55.5% of trichloroethylene, 13.3% of perchloroethylene, 25.4% of dichloroethylenes with the remainder being vinyl chloride and chloro-derivatives of ethane. The utilization of chlorine was 79%, and of ethylene 91%.

*Example 6.—Oxychlorination of ethylene*

In another experiment involving the same kind of catalyst in the same amount as in Example 5, the rates of introduction of gases (in millimoles per minutes) were: ethylene 15.0, hydrogen chloride 26.8, air 31.0, oxygen 4.0. The reaction temperature was 350° C. The chlorine utilization was 96%, and ethylene utilization was 76%. Only 2% of the ethylene originally introduced was oxidized to carbon monoxide and carbon dioxide. The product mixture contained 94% of 1,2-dichloroethane.

*Example 7.—Preparation of catalyst*

Celite particles (56 g., mesh size 140–325+) were mixed for 15 minutes with 150 ml. of an aqueous solution containing 6.2 g. of cupric chloride, 6.2 g. of didymium chloride and 1 g. of magnesium chloride. The excess liquid was decanted and the moist particles were mixed with 170 ml. of an aqueous solution containing 25 g. of sodium silicate. The solid particles were separated from the liquids and washed four times with 150-ml. portions of distilled water, and then dried at room temperature overnight.

*Example 8.—Oxychlorination of ethane*

A glass reaction system was used in this experiment, and consisted of two catalytic fluid bed reactors, similar to the reactor described in Example 2 above, connected in series. The top of the first reactor was connected by a glass tube to the bottom of the second reactor. A collection tube was attached to the lower part of this connector. The bulk of the water formed in the first reactor condensed in this collection tube. The reactant gases were introduced and passed through the first reactor and the product mixture was directed through the connecting tube into the second reactor. Additional amounts of reactants could be introduced directly into the second reactor. The first reactor was charged with 18 g., and the second reactor with 12.5 g. of the catalyst described in Example 7. The flow rates of gases into the first reactor (in millimoles per minute) were: ethane 9.6, chlorine 10.0, hydrogen chloride 9.9, air 49.9; and into the second reactor: chlorine 1.88, oxygen 3.76. The reaction temperature in the first reactor was 474° C. and in the second reactor was 476° C. The utilization of chlorine was 65%, and of ethane was 75%. Ethane lost because of oxidation was 22%. The product mixture consisted of 45.2% of trichloroethylene, 26% of perchloroethylene, 26.5% of dichloroethylenes, and 2.3% of other chloro-derivatives of hydrocarbons. Thus all of the Deacon, oxychlorination and dehydrochlorination reactions occurred in this overall reaction and produced from ethane the unsaturated chlorinated materials trichloroethylene, perchloroethylene and dichloroethylenes.

Pursuant to the requirements of the patent statutes, the principle of this invention has been explained and exemplified in a manner so that it can readily be practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A catalyst for Deacon reactions, oxychlorination reactions and dehydrochlorination reactions, consisting essentially of a mixture of (a) cupric silicate and (b) a magnesium compound from the group consisting of magnesium chloride and magnesium silicate, in relative proportions of (a) to (b) to provide 0.1 to 4 moles of magnesium ion per mole of cupric ion, said catalyst being carried on a porous adsorptive carrier.

2. The catalyst of claim 1 in which the relative proportions of magnesium ion to cupric ion are 0.5 to 3 moles of magnesium ion per mole of cupric ion.

3. The catalyst of claim 1 which contains in addition to said cupric silicate and said magnesium compound, a didymium compound from the group consisting of didymium chloride and didymium silicate in the amount of 0 to 4 moles of didymium ion per mole of cupric ion.

References Cited

UNITED STATES PATENTS

| | | | |
|---|---|---|---|
| 2,204,733 | 6/1940 | Miller | 252—441 X |
| 2,448,255 | 7/1948 | De Benedictis et al. | 252—441 |
| 2,470,193 | 5/1949 | Stratford | 252—455 X |
| 2,548,159 | 4/1951 | Houtman et al. | 252—455 |
| 2,636,864 | 4/1953 | Pye et al. | 252—441 |
| 3,260,678 | 7/1966 | Engel et al. | 23—219 X |

DANIEL E. WYMAN, *Primary Examiner.*

EDWARD STERN, *Examiner.*

L. G. XIARHOS, *Assistant Examiner.*